(No Model.)

J. M. STEWARD.
LOBSTER TRAP.

No. 363,858. Patented May 31, 1887.

Witnesses:
E. Planta.
O. M. Shaw.

Inventor.
Joseph M. Steward,
Per C. C. Shaw,
Attorney.

UNITED STATES PATENT OFFICE.

JOSEPH M. STEWARD, OF BOSTON, ASSIGNOR TO THE CLINTON WIRE CLOTH COMPANY, OF CLINTON, MASSACHUSETTS.

LOBSTER-TRAP.

SPECIFICATION forming part of Letters Patent No. 363,858, dated May 31, 1887.

Application filed September 18, 1886. Serial No. 213,879. (No model.)

*To all whom it may concern:*

Be it known that I, JOSEPH M. STEWARD, of Boston, in the county of Suffolk, State of Massachusetts, have invented a certain new and useful Improvement in Lobster-Traps, of which the following is a description sufficiently full, clear and exact to enable any person skilled in the art or science to which said invention appertains to make and use the same, reference being had to the accompanying drawings, forming part of this specification, in which—

Figure 1:
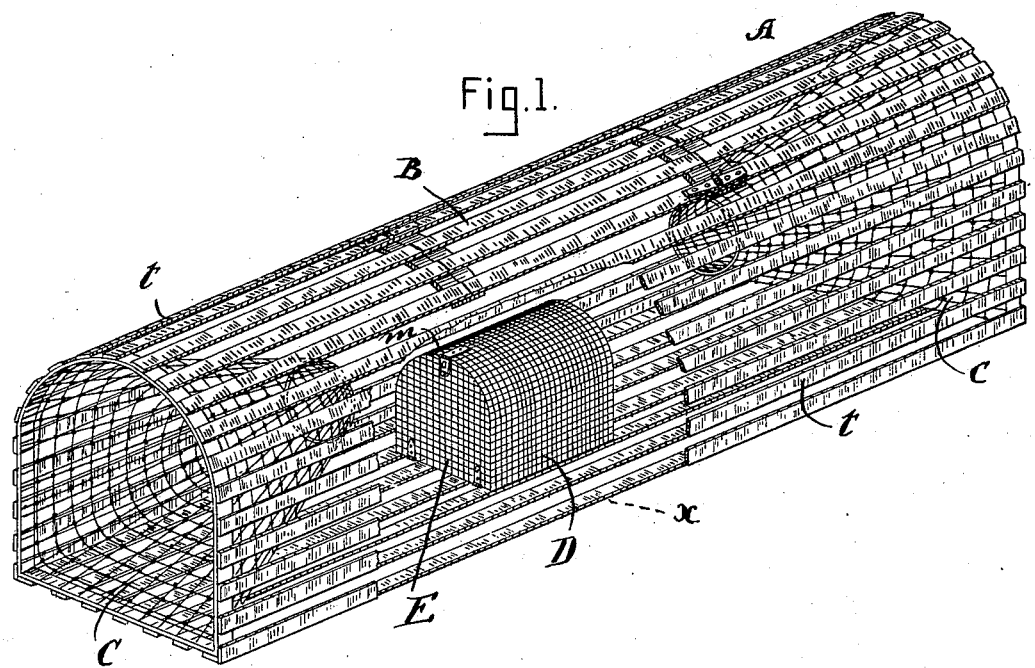
Figure 2:
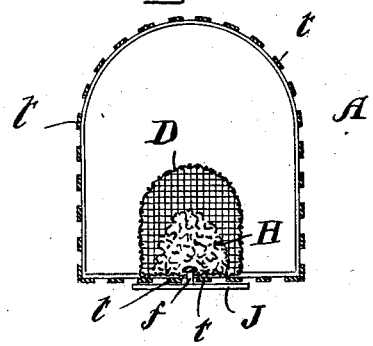

Figure 1 is an isometrical perspective view of my improved trap, a portion of one side being represented as broken away to show the bait-box; and Fig. 2, a vertical transverse section of the same, taken on the dotted line $x$ in Fig. 1.

Like letters of reference indicate corresponding parts in the different figures of the drawings.

It is well known that in lobster-traps as ordinarily constructed the body of the trap is composed of slats or rails arranged in parallelism, and so disposed as to leave spaces between the same through which minnows, small fish, crabs, sea-worms, &c., pass into the trap and devour the bait; and also that after the bait is destroyed the lobster will not enter the trap. It thus frequently occurs in this class of fishing that when a trap is "hauled," even after having been set but a few hours, it will be found to contain neither bait nor lobsters, the bait having been eaten by small fish and the lobsters consequently left without any inducement to be captured.

My invention is designed to obviate this difficulty or objection; and to that end I make use of means which will be readily understood by all conversant with such matters from the following explanation.

In the drawings, A represents the body of the trap, B the cover, and C C the funnels or chutes, these parts being of the ordinary form and construction.

Disposed centrally within the body of the trap, and secured to the bottom thereof, is a bait-box, D, composed of wire-cloth or similar reticulated fabric, the meshes of which are sufficiently small or fine to prevent ordinary minnows or small fish from passing through the same, but not fine enough to prevent a free circulation of water through the box. The box is provided with a hinged door, E, through which the bait H is introduced, said door being fastened when closed by an ordinary hasp, $m$. A button, J, is pivoted to the bottom of the box by the bolt $f$, the button being so constructed and arranged that when turned longitudinally with respect to the body of the box it may be passed down between the slats $t$, of which the bottom of the body is composed, and then turned into the position shown in Fig. 2, thereby securing the box in the trap in a manner which will be readily understood by persons conversant with such matters without a more explicit description.

The openings in the bait-box for the circulation of the water should always be fine enough to prevent the entrance of ordinary minnows and such small fish as usually pass between the slats $t$ of the body A, so that in case a few minnows pass through said openings they will not be large enough to devour a sufficient quantity of the bait during an ordinary immersion of the trap to interfere materially with its efficiency.

I do not confine myself to securing the bait-box to the body of the trap in any special manner, or, in fact, to securing it to the body at all, as it may be left unattached, if desired. Neither do I confine myself to constructing the body A in any special form or manner, or with two chutes, C, as only one may be used, if preferred; nor to constructing the bait-box of any special material or in any special form, provided it has openings for the water which are sufficiently fine or small to substantially prevent the fish from destroying the bait, it being understood that lobsters are not attracted to the trap by the sight but by the smell of the bait, and hence that a comparatively free circulation of water through the bait-box is absolutely essential.

Having thus explained my invention, what I claim is—

1. A lobster-trap having reticulations or openings in its body for water circulation and provided with an inwardly-projecting conical funnel for the entrance of lobsters, in combination with a bait-box within said trap, provided with reticulations or openings for water circulation, such openings being sufficiently small to exclude minnows, crabs, and other small fish liable to consume the bait during an ordinary immersion, substantially as described.

2. In a lobster-trap, the bait-box D, composed of wire-cloth or similar recticulated fabric and provided with a door or opening through which the bait may be introduced, in combination with the body A, having a cover or opening for removing the lobsters, and a funnel or chute through which the lobsters pass into said body, substantially as set forth.

JOSEPH M. STEWARD.

Witnesses:
C. A. SHAW,
O. M. SHAW.